United States Patent
Armangau (12)

(10) Patent No.: US 10,372,347 B2
(45) Date of Patent: Aug. 6, 2019

(54) SELECTIVELY LIMITING THROUGHPUT OF TEST OBJECTS THAT SHARE SYSTEM RESOURCES WITH PRODUCTION OBJECTS

(71) Applicant: EMC IP Holding Company LLC, Hopkinton, MA (US)

(72) Inventor: Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 15/798,558

(22) Filed: Oct. 31, 2017

(65) Prior Publication Data
US 2019/0129626 A1 May 2, 2019

(51) Int. Cl.
*G06F 11/00* (2006.01)
*G06F 3/06* (2006.01)
*G06F 9/50* (2006.01)
*G06F 11/36* (2006.01)

(52) U.S. Cl.
CPC .......... *G06F 3/0613* (2013.01); *G06F 3/065* (2013.01); *G06F 3/0619* (2013.01); *G06F 3/0665* (2013.01); *G06F 3/0689* (2013.01); *G06F 9/5055* (2013.01); *G06F 11/368* (2013.01)

(58) Field of Classification Search
CPC ...... G06F 3/0613; G06F 3/0619; G06F 3/065; G06F 3/0665; G06F 3/0689; G06F 9/5055; G06F 11/368
See application file for complete search history.

(56) References Cited

U.S. PATENT DOCUMENTS

| | | | |
|---|---|---|---|
| 6,119,235 A | 9/2000 | Vaid et al. | |
| 7,529,836 B1 * | 5/2009 | Bolen | G06F 3/0611 709/226 |
| 8,051,324 B1 * | 11/2011 | Zhao | G06F 11/3485 700/3 |
| 8,473,566 B1 | 6/2013 | Cardente et al. | |
| 9,747,222 B1 | 8/2017 | Armangau et al. | |
| 9,934,172 B1 | 4/2018 | Koli et al. | |
| 10,235,055 B1 * | 3/2019 | Saad | G06F 3/067 |
| 2003/0079019 A1 | 4/2003 | Lolayekar et al. | |
| 2005/0261879 A1 * | 11/2005 | Shrivastava | G06F 11/0715 702/186 |
| 2012/0005531 A1 * | 1/2012 | Manuzak | G06F 11/0709 714/25 |

* cited by examiner

*Primary Examiner* — Jason B Bryan
(74) *Attorney, Agent, or Firm* — BainwoodHuang

(57) ABSTRACT

A technique for managing I/O (input/output) requests in a data storage system includes receiving a set of I/O requests directed to (i) a production data object stored in the data storage system and (ii) a set of test versions of the production data object, each of the set of test versions stored in the data storage system. The technique further includes identifying, from among the set of received I/O requests, I/O requests directed to the set of test versions of the production data object and selectively throttling a throughput of the identified I/O requests directed to the test versions relative to a throughput of I/O requests directed to the production data object.

20 Claims, 3 Drawing Sheets

US 10,372,347 B2

SELECTIVELY LIMITING THROUGHPUT OF TEST OBJECTS THAT SHARE SYSTEM RESOURCES WITH PRODUCTION OBJECTS

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems allow developers or other users to create read-write versions of production data objects for testing, debugging, and/or simulation. For example, an engineer may create a thin clone of a production LUN (Logical UNit) and may use the thin clone to try out new software or to test various scenarios. As is known, a "thin clone" is a read-write, point-in-time version of a thinly-provisioned LUN or other block-addressable object. Thin clones are distinct objects that initially share underlying data blocks with their parent objects but may diverge over time as new writes arrive. Thin clones may be arranged in a hierarchy. For example, one may create a child thin clone from a snapshot of a parent thin clone.

U.S. Pat. No. 8,051,324 describes a QoS (Quality of Service) application that enables certain classes of I/O requests to be limited in accordance with performance goals. Each I/O class is a logical grouping of I/O requests as received by a data storage system and may be defined in accordance with one or more attributes.

SUMMARY

Unfortunately, test versions such as thin clones can interfere with operation of production objects. For example, engineering activities in testing or debugging software running on test versions can consume significant CPU (central processing unit) resources and memory, which can reduce the resources available to corresponding production objects and thus impair the ability of a data storage system to meet service level requirements for the corresponding production objects.

In contrast with prior arrangements, in which test versions may impair the performance of a production object, an improved technique for managing I/O (input/output) requests in a data storage system identifies I/O requests directed to test versions and selectively throttles their throughput relative to that of a corresponding production object. Throttling the throughput of test versions causes them to consume fewer system resources, leaving more resources available to the production object, which is then more able to meet service level requirements.

Certain embodiments are directed to a method of managing I/O (input/output) requests in a data storage system. The method includes receiving a set of I/O requests directed to (i) a production data object stored in the data storage system and (ii) a set of test versions of the production data object. The method further includes identifying, from among the set of received I/O requests, I/O requests directed to the set of test versions of the production data object and selectively throttling a throughput of the identified I/O requests directed to the test versions relative to a throughput of I/O requests directed to the production data object.

In some examples, selectively throttling the throughput of the identified I/O requests includes enforcing a minimum delay in processing each of the identified I/O requests directed to the set of test versions.

In some examples, enforcing the minimum delay in processing each of the identified I/O requests is achieved via a delay interposed in an I/O stack of the data storage system prior to performing a read or write operation prescribed by the respective I/O request.

In some examples, the method further includes varying the minimum delay enforced when processing each of the identified I/O requests in response to changes in a level of activity of the data storage system.

According to some examples, the production data object is a production LUN (Logical UNit) and each of the set of test versions is a thin clone of the production LUN.

According to some examples, each of the set of test versions is user-accessible from the data storage system using a respective logical unit number, and identifying the I/O requests directed to the set of test versions includes (a) maintaining a list of logical unit numbers by which each of the set of test versions is made user-accessible, (b) upon receiving each of the set of I/O requests, performing a testing operation configured to (i) produce a first result in response to the I/O request being directed to a logical unit number on the list of logical unit numbers and (ii) produce a second result in response to the I/O request being directed to a logical unit number not on the list of logical unit numbers, and (c) for each I/O request for which the testing operation produces the first result, providing the I/O request as one of the identified I/O requests directed to the set of test versions.

In some examples, the data storage system stores the LUN as a file within a container file system, and the data storage system stores each of the set of thin clones as a respective other file within the container file system.

According to some examples, the measurements of activity within the data storage system include at least one of (i) measurements CPU (central processing unit) activity within a storage processor that receives the I/O requests directed to the set of test versions and (ii) measurements of memory utilization within the storage processor that receives the I/O requests directed to the set of test versions.

According to some examples, the measurements of activity within the data storage system include measurements of activities performed on the container file system, such as numbers of I/O requests per second, numbers of resource locks, and numbers of free buffer caches.

Other embodiments are directed to a data storage system constructed and arranged to perform a method of managing I/O requests, such as the method described above. Still other embodiments are directed to a computer program product. The computer program product stores instructions which, when executed on control circuitry of a data storage system, cause the data storage system to perform a method of managing I/O requests, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for managing I/O (input/output) requests in a data storage system identifies I/O requests directed to test versions of a production data object and selectively throttles their throughput relative to that of the corresponding production object. Throttling the throughput of the test versions causes them to consume fewer system resources, leaving more resources available to production object, which is then more able to meet service level requirements.

Figure 1:
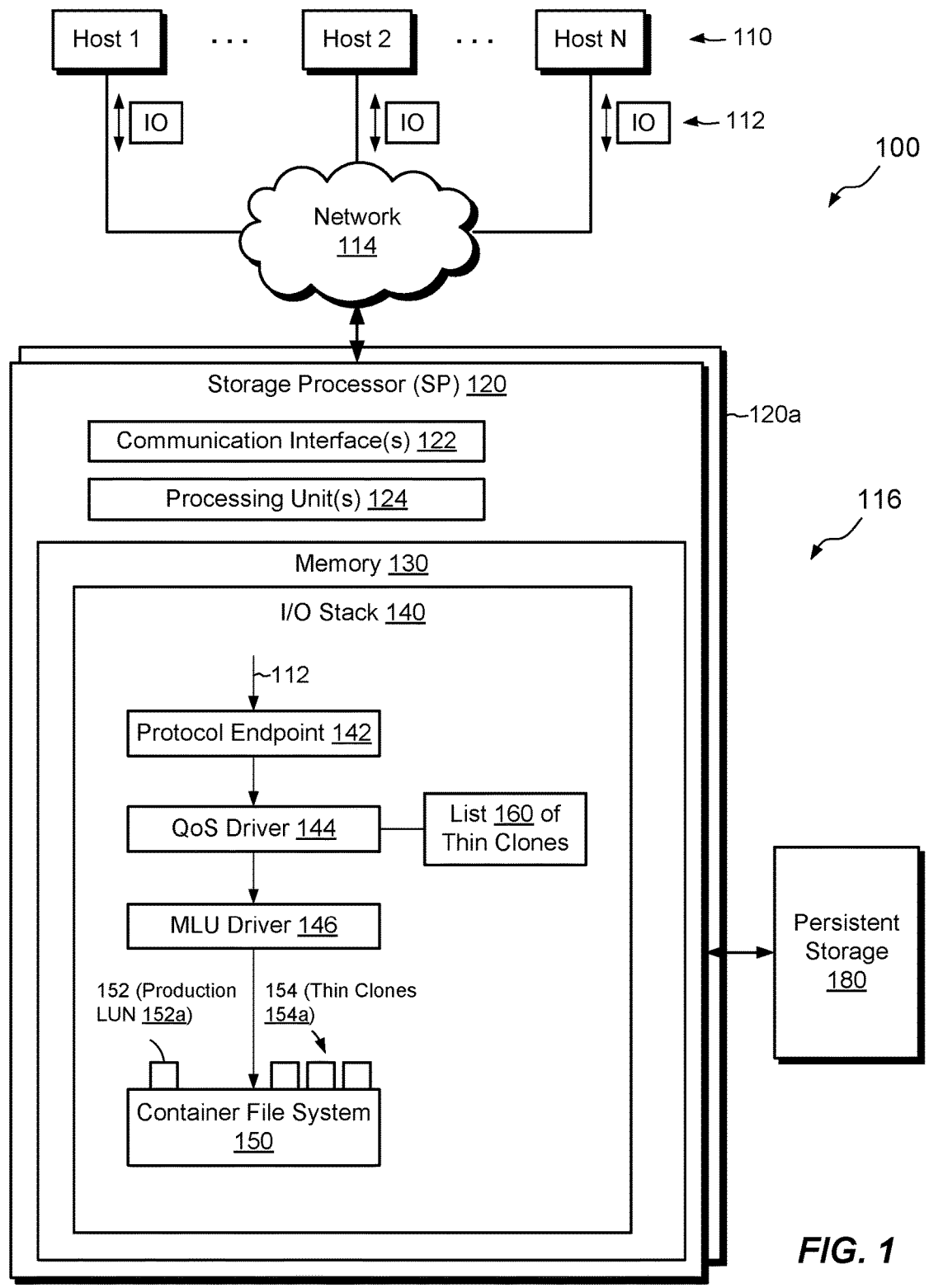
FIG. 1 is a block diagram of an example environment in which the improved technique hereof can be practiced.

FIG. 1 shows an example environment 100 in which embodiments of the improved technique hereof can be practiced. Here, multiple host computing devices ("hosts") 110 connect to a data storage system 116 over a network 114. The data storage system 116 includes a storage processor, or "SP," 120 and persistent storage 180, such as magnetic disk drives, electronic flash drives, and the like. The data storage system 116 may include multiple SPs like the SP 120 (e.g., a second SP 120a). In an example, multiple SPs may be provided as circuit board assemblies, or "blades," which plug into a chassis that encloses and cools the SPs. It is understood that no particular hardware configuration is required, however, as any number of SPs may be provided, including a single SP, and the SPs can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI (Internet small computer system interface), NFS (network file system), and CIFS (common Internet file system), for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 180.

The SP 120 includes one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, an I/O stack 140 for processing I/O requests 112. The I/O stack 140 includes a protocol endpoint 142, a QoS (quality of service) driver 144, an MLU (mapped LUN) driver 146, and a container file system 150. The protocol endpoint 142 receives I/O requests 112 in accordance with a block-based protocol, such as SCSI (Small Computer System Interface) or FC (Fibre Channel). For example, protocol endpoint 142 is configured as a SCSI target. QoS driver 144 is configured to identify I/O requests 112 that are directed to test versions of a production object and to limit their throughput. MLU driver 146 is configured to perform mapping of I/O requests to files in the container file system 150.

In an example, the container file system 150 is an internal file system which is preferably hidden from hosts 110. A file 152 in the container file system 150 includes a production data object, such as a production LUN 152a. For example, the MLU driver 146 expresses the file 152 as a volume, e.g., by creating a volume object (not shown) and mapping logical addresses in the file 152 to physical addresses in the volume object. The MLU driver 146 lays out the production LUN 152a on the volume object. Files 154 in the container file system 150 contain test versions 154a of the production data object. Any number of files 154 may be provided, and the test versions 154a may be arranged in a hierarchy. For example, some test versions 154a in files 154 are point-in-time versions (e.g., clones) of the production object in file 152, whereas other test versions are point-in-time versions of clones, with all clones being descendants of the production object 152a. In an example, each file 154 is generated as a read-write thin clone. Each of the thin clones 154a initially shares all data blocks with its parent object (the production LUN or another thin clone). The clones are "thin" because they have no space reservations. The thin clones 154a may require additional storage space as they differentiate from their parent objects, but the data storage system 116 does not guarantee that the storage needed to support their growth will be available.

In example operation, hosts 110 issue I/O requests 112 that direct the data storage system 116 to perform reads and/or writes of specified data. Some of the I/O requests 112 are directed to the production LUN 152a. Other I/O requests 112 are directed to one or more of the thin clones 154a. For example, engineers or other members or an organization may create thin clones 154a to perform development, simulations, or debugging, which would not be advisable to perform on the production LUN 152a. As I/O requests 112 directed to thin clones 154a arrive, SP 120 processes the I/O requests to effect reads and writes on the files 154. At some point, the activity of SP 120 to accommodate I/O requests 112 directed to thin clones 154a may become substantial, such that such activity starts to impair the ability of SP 120 to meet its service level agreement (SLA) with respect to the production LUN 152a. For example, the SLA may specify a minimum number of I/O requests per second (IOPS) for production LUN 152a or a maximum I/O request latency (time between receipt of an I/O request and a response to that I/O request). If the SP 120 becomes highly burdened by servicing I/O requests directed to thin clones 154a, it may be unable to meet the SLA requirements for the production LUN 152a.

To avoid this scenario, the QoS driver 144 selectively throttles I/O requests 112 directed to thin clones 154a. For example, the SP 120 maintains a list 160 of thin clones 154a. Whenever an I/O request 112 arrives, the QoS driver 144 checks whether the target of the I/O request 112 is on the list 160, i.e., whether it is one of the thin clones 154a. If the target is on the list 160, the QoS driver 144 delays the propagation of the I/O request 112 down the I/O stack 140. If the I/O request 112 is not on the list 160, the QoS driver 144 allows the I/O request to pass with no delay, or with a lesser delay. The effect of delaying individual I/O requests 112 directed to thin clones 154a is to reduce the throughput of I/O requests 112 directed to thin clones 154a and thus to reduce consumption of system resources for processing thin clones 154a, leaving more resources available for processing I/O requests directed to the production LUN 152a.

In an example, the list 160 contains logical unit numbers (LUNs) of the thin clones 154a. For example, each of the thin clones 154a is itself a LUN, which is host-accessible using a block-based protocol. To identify I/O requests 112 directed to thin clones 154a, the QoS driver 144 checks the logical unit number to which each I/O request 112 is directed and performs a lookup into list 160. A match of logical unit number of the I/O request to an entry on the list 160 confirms that the I/O request is directed to a thin clone and should be delayed accordingly.

Figure 2:
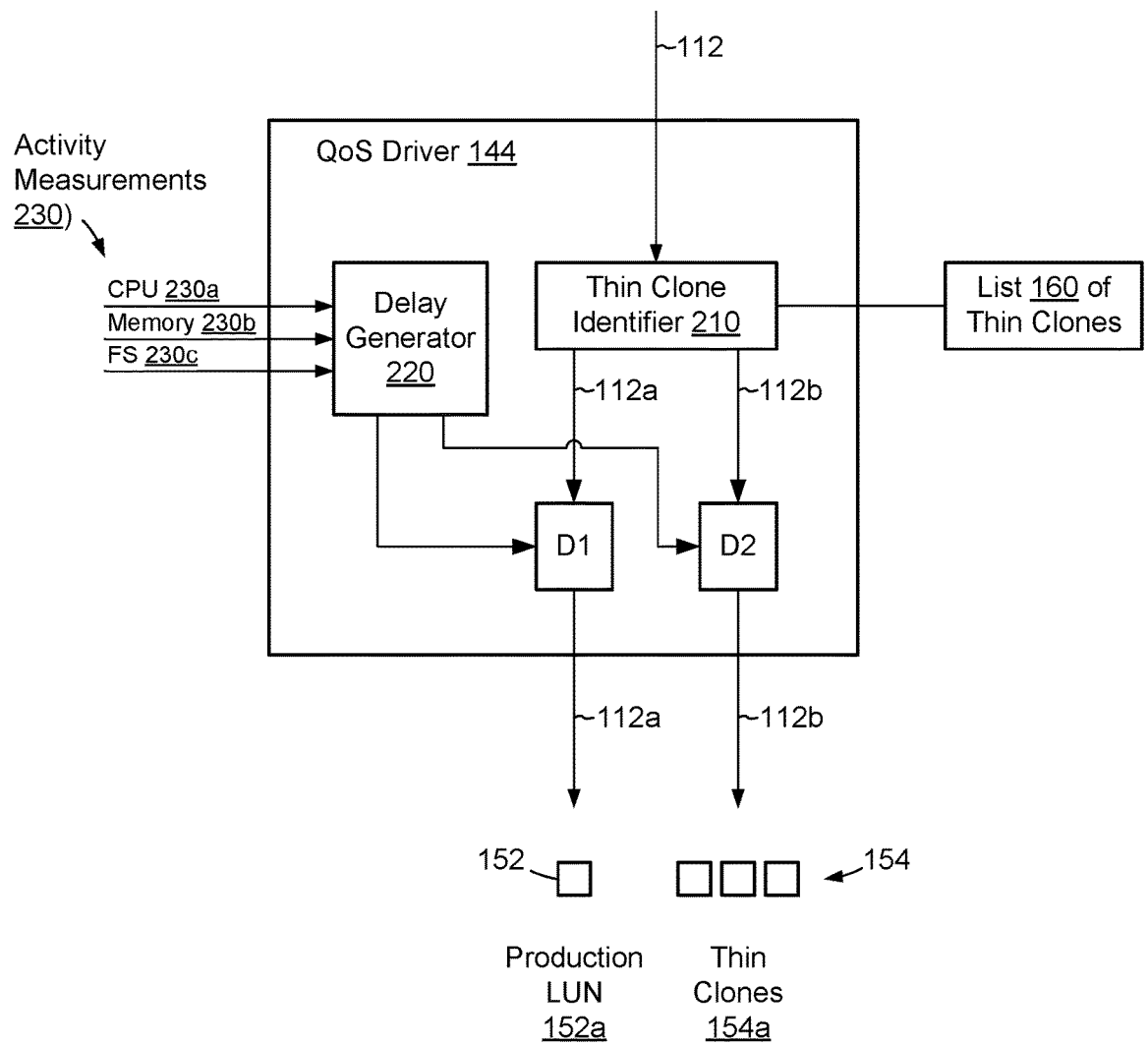
FIG. 2 is a block diagram showing an example arrangement for delaying I/O requests so as to throttle their throughput.

FIG. 2 shows example features of the QoS driver 144 in additional detail. Here, QoS driver 144 is seen to include a thin clone identifier 210, a delay generator 220, and variable delays D1 and D2. The thin clone identifier 210 receives I/O requests 112, e.g., from protocol endpoint 142. In response to each I/O request 112, the thin clone identifier 210 checks whether a logical unit number accompanying the I/O request 112 can be found on the list 160. If no match is found, then thin clone identifier 210 passes the I/O request as request 112a to delay D1, which may be set to zero or to some other value which is less than D2. The request 112a propagates down the I/O stack 140 to file 152, where the specified read or write is performed on the production LUN 152a. However, if a match is found, indicating that the I/O request 112 is directed to a thin clone 154a, then thin clone identifier 210 passes the I/O request as request 112b to delay D2, which is greater than D1. The request 112b propagates down the I/O stack 140 to one of the files 154, where the specified read or write is performed on a thin clone 154a.

In some examples, delays D1 and D2 are variable based on output from delay generator 220. For example, delay generator 220 receives inputs that provide activity measurements 230 describing activity in the SP 120. Example activity measurements 230 may include the following:

CPU Activity 230a. A percent utilization or other measure of CPU activity on SP 120.

Memory Consumption 230b. An amount (or percentage) of free memory on SP 120 or of memory in use.

File System Activity 230c. One or more measures of activity of the container file system 150, such as numbers of I/O requests per second, numbers of resource locks, numbers of free buffer caches, and the like.

Delay generator 220 receives these inputs, or any combination thereof, and generates delays for D1 and D2 accordingly. For example, if the activity measurements 230 indicate that the SP 120 is very busy, then delay generator 220 may set D1 to zero and set D2 to a large number, such as tens or hundreds of milliseconds. But if the activity measurements 230 indicate that the SP 120 is very busy, then delay generator 220 may set both D1 and D2 to zero. In some examples, delay generator 220 updates delays D1 and D2 on a regular basis, such as once every ten seconds or once per minute, for example.

One should appreciate that the variable delay D1 may be optional, as it may always be the best choice to provide zero delay for writes to the production LUN 152a, so as to maximize its throughput. However, there are times when allowing delay D1 to be greater than zero may be helpful, e.g., to limit power consumption in the SP 120 while staying within service level requirements, or to balance the throughput to production LUN 152 with throughput to other production data objects served by the data storage system 116.

Figure 3:
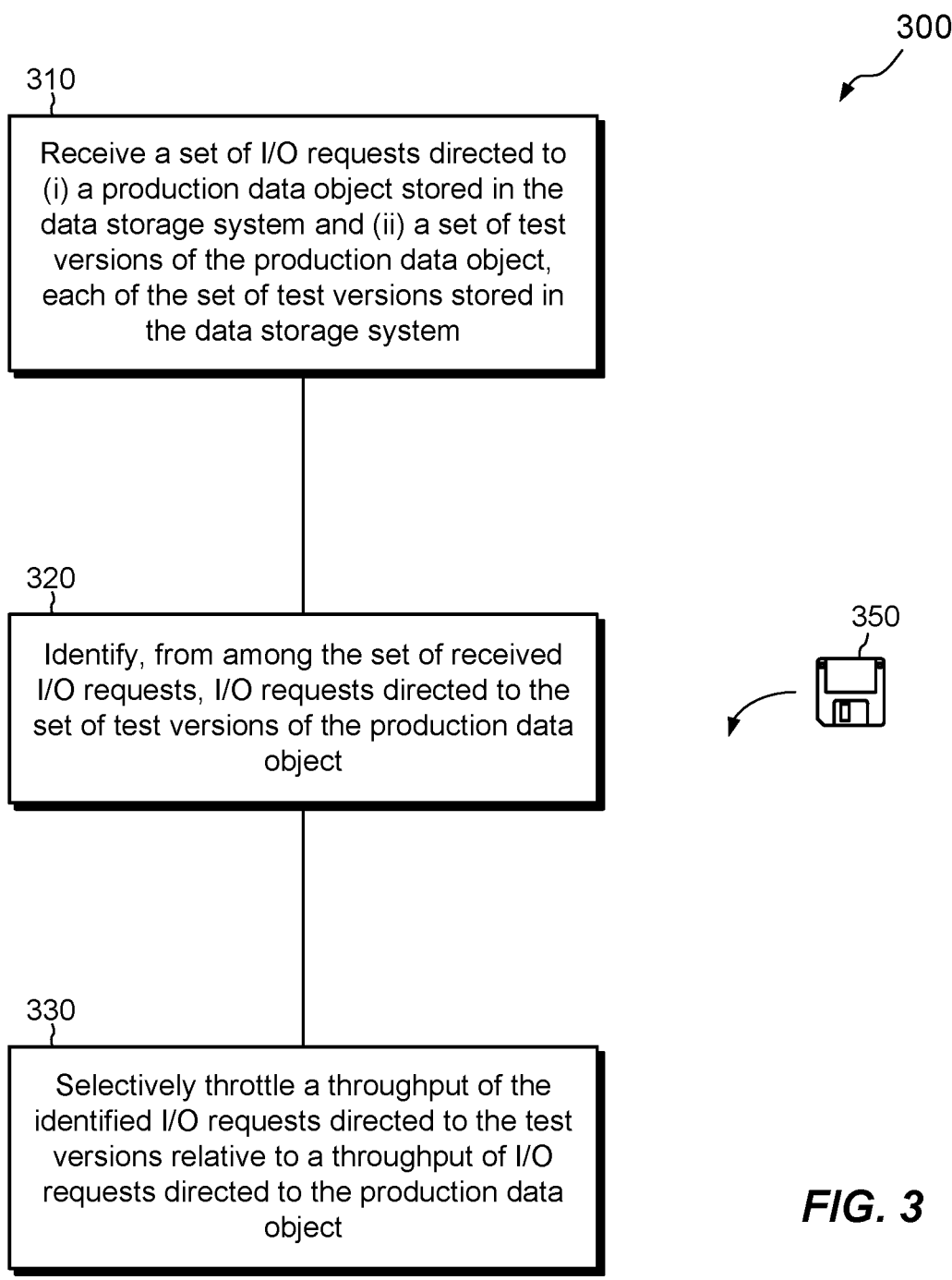
FIG. 3 is a flowchart showing an example method of managing I/O requests in a data storage system.

FIG. 3 shows an example method 300 that may be carried out in connection with the environment 100 and provides a summary of some of the activities described above. The method 300 is typically performed, for example, by the software constructs described in connection with FIGS. 1 and 2, which reside in the memory 130 of the storage processor 120 and are run by the set of processing units 124. The various acts of method 300 may be ordered in any suitable way. Accordingly, embodiments may be constructed in which acts are performed in orders different from that illustrated, which may include performing some acts simultaneously.

At 310, a set of I/O requests 112 are received, which are directed to (i) a production data object 152a stored in the data storage system 116 and (ii) a set of test versions 154a of the production data object 152a. Each of the set of test versions 154a is also stored in the data storage system 116.

At 320, I/O requests 112b directed to the set of test versions 154a of the production data object 152a are identified from among the set of received I/O requests 112.

At 330, a throughput of the identified I/O requests 112b directed to the test versions 154a is selectively throttled relative to a throughput of I/O requests 112a directed to the production data object 152a.

An improved technique has been described for managing I/O requests 112 in a data storage system 116. The improved technique identifies I/O requests 112b directed to test versions 154a and selectively throttles their throughput relative to that of a corresponding production object 152a. Throttling the throughput of test versions 154a causes them to consume fewer system resources, leaving more resources available to the production object 152a, which is then more able to meet service level requirements.

Having described certain embodiments, numerous alternative embodiments or variations can be made. For example, although production data objects have been described herein as production LUNs, this is merely an example, as the production objects may also be virtual machine disks, consistency groups of multiple production LUNs, or host-accessible file systems.

Also, although the test versions have been described herein as thin clones, they may alternatively be other types of clones (e.g., thick clones) or other point-in-time versions. Further, the test versions need not share data blocks with the production data object or with one another.

Further, although embodiments have been described in which a list 160 of test versions is provided and the QoS driver 144 checks the list for each arriving I/O request 112, the invention is not limited to this arrangement. For example, the SP 120 may automatically assign a particular QoS value to a test version, e.g., at the time the test version is created. QoS values assigned to test versions may be set to lower values than QoS values assigned to production data objects. The SP 120 may then associate QoS values with logical unit numbers. When an I/O request 112 directed to a particular object arrives, the QoS driver 144 identifies the QoS value associated with the logical unit number of that object and throttles the I/O request accordingly, e.g., by delaying I/O requests directed to test versions more than it delays I/O requests directed to production data objects.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 350 in FIG. 3). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing I/O (input/output) requests in a data storage system, the method comprising:
    receiving a set of I/O requests directed to (i) a production data object stored in the data storage system and (ii) a set of test versions of the production data object, each of the set of test versions stored in the data storage system;
    identifying, from among the set of received I/O requests, I/O requests directed to the set of test versions of the production data object; and
    selectively throttling a throughput of the identified I/O requests directed to the test versions relative to a throughput of I/O requests directed to the production data object.

2. The method of claim 1, wherein selectively throttling the throughput of the identified I/O requests includes enforcing a minimum delay in processing each of the identified I/O requests directed to the set of test versions.

3. The method of claim 2, wherein enforcing the minimum delay in processing each of the identified I/O requests is achieved via a delay interposed in an I/O stack of the data storage system prior to performing a read or write operation prescribed by the respective I/O request.

4. The method of claim 2, further comprising varying the minimum delay enforced when processing each of the identified I/O requests in response to changes in a level of activity of the data storage system.

5. The method of claim 4, wherein the production data object is a production LUN (Logical UNit) and wherein each of the set of test versions is a thin clone of the production LUN.

6. The method of claim 5, wherein each of the set of test versions is user-accessible from the data storage system using a respective logical unit number, and wherein identifying the I/O requests directed to the set of test versions includes:
    maintaining a list of logical unit numbers by which each of the set of test versions is made user-accessible;
    upon receiving each of the set of I/O requests, performing a testing operation configured to (i) produce a first result in response to the I/O request being directed to a logical unit number on the list of logical unit numbers and (ii) produce a second result in response to the I/O request being directed to a logical unit number not on the list of logical unit numbers; and
    for each I/O request for which the testing operation produces the first result, providing the I/O request as one of the identified I/O requests directed to the set of test versions.

7. The method of claim 5, wherein the data storage system stores the LUN as a file within a container file system, and wherein the data storage system stores each of the set of thin clones as a respective other file within the container file system.

8. The method of claim 7, wherein the measurements of activity within the data storage system include at least one of (i) measurements CPU (central processing unit) activity within a storage processor that receives the I/O requests directed to the set of test versions and (ii) measurements of memory utilization within the storage processor that receives the I/O requests directed to the set of test versions.

9. The method of claim 8, wherein the measurements of activity within the data storage system further include measurements of activities performed on the container file system.

10. A data storage system, comprising control circuitry that includes a set of processing units coupled to memory, the control circuitry constructed and arranged to:
receive a set of I/O requests directed to (i) a production data object stored in the data storage system and (ii) a set of test versions of the production data object, each of the set of test versions stored in the data storage system;
identify, from among the set of received I/O requests, I/O requests directed to the set of test versions of the production data object; and
selectively throttle a throughput of the identified I/O requests directed to the test versions relative to a throughput of I/O requests directed to the production data object.

11. The data storage system of claim 10, wherein each of the set of test versions is user-accessible from the data storage system using a respective logical unit number, and wherein the control circuitry constructed and arranged to identify the I/O requests directed to the set of test versions is further constructed and arranged to:
maintain a list of logical unit numbers by which each of the set of test versions is made user-accessible;
upon receipt of each of the set of I/O requests, perform a testing operation configured to (i) produce a first result in response to the I/O request being directed to a logical unit number on the list of logical unit numbers and (ii) produce a second result in response to the I/O request being directed to a logical unit number not on the list of logical unit numbers; and
for each I/O request for which the testing operation produces the first result, provide the I/O request as one of the identified I/O requests directed to the set of test versions.

12. A computer program product including a set of non-transitory, computer-readable media having instructions which, when executed by control circuitry of a data storage system, cause the control circuitry to perform a method for managing I/O (input/output) requests, the method comprising:
receiving a set of I/O requests directed to (i) a production data object stored in the data storage system and (ii) a set of test versions of the production data object, each of the set of test versions stored in the data storage system;
identifying, from among the set of received I/O requests, I/O requests directed to the set of test versions of the production data object; and
selectively throttling a throughput of the identified I/O requests directed to the test versions relative to a throughput of I/O requests directed to the production data object.

13. The computer program product of claim 12, wherein selectively throttling the throughput of the identified I/O requests includes enforcing a minimum delay in processing each of the identified I/O requests directed to the set of test versions.

14. The computer program product of claim 13, wherein enforcing the minimum delay in processing each of the identified I/O requests is achieved via a delay interposed in an I/O stack of the data storage system prior to performing a read or write operation prescribed by the respective I/O request.

15. The computer program product of claim 13, wherein the method further comprises varying the minimum delay enforced when processing each of the identified I/O requests in response to changes in a level of activity of the data storage system.

16. The computer program product of claim 15, wherein the production data object is a production LUN (Logical UNit) and wherein each of the set of test versions is a thin clone of the production LUN.

17. The computer program product of claim 16, wherein each of the set of test versions is user-accessible from the data storage system using a respective logical unit number, and wherein identifying the I/O requests directed to the set of test versions includes:
maintaining a list of logical unit numbers by which each of the set of test versions is made user-accessible;
upon receiving each of the set of I/O requests, performing a testing operation configured to (i) produce a first result in response to the I/O request being directed to a logical unit number on the list of logical unit numbers and (ii) produce a second result in response to the I/O request being directed to a logical unit number not on the list of logical unit numbers; and
for each I/O request for which the testing operation produces the first result, providing the I/O request as one of the identified I/O requests directed to the set of test versions.

18. The computer program product of claim 16, wherein the method further comprises storing the LUN as a file within a container file system, and wherein the data storage system stores each of the set of thin clones as a respective other file within the container file system.

19. The computer program product of claim 18, wherein the measurements of activity within the data storage system include at least one of (i) measurements CPU (central processing unit) activity within a storage processor that receives the I/O requests directed to the set of test versions and (ii) measurements of memory utilization within the storage processor that receives the I/O requests directed to the set of test versions.

20. The computer program product of claim 19, wherein the measurements of activity within the data storage system further include measurements of activities performed on the container file system.

* * * * *